(No Model.)
O. D. WOODRUFF.
MEAT CUTTER.
No. 481,882.  Patented Aug. 30, 1892.
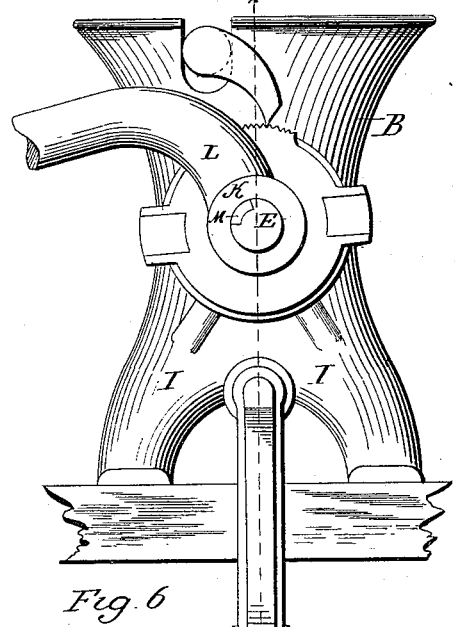
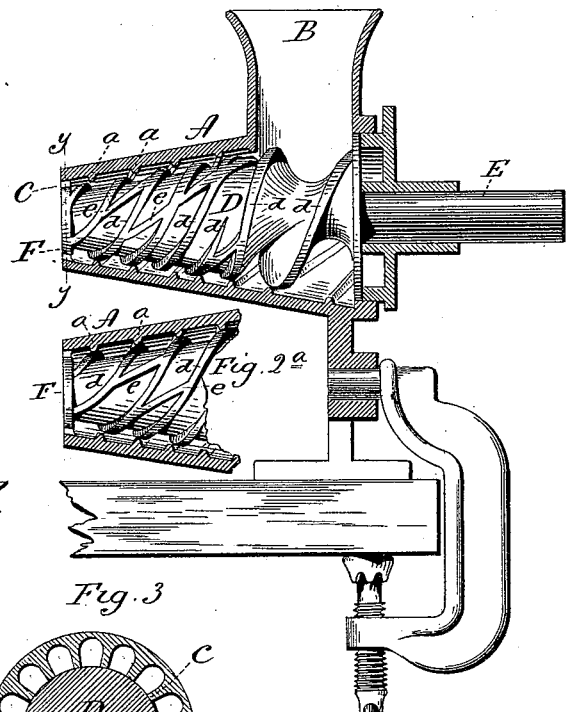
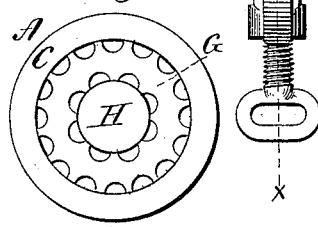
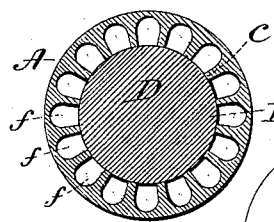
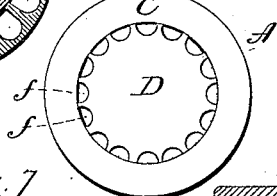
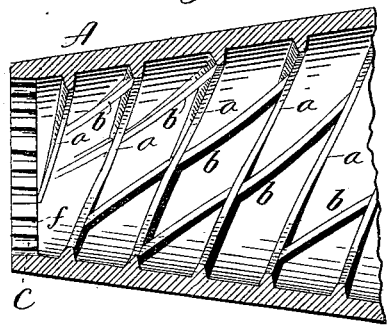
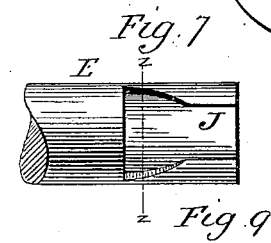
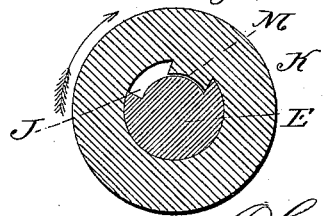
Witnesses
J. N. Shumway
Lillian D. Kelsey
Oliver D. Woodruff
Inventor
By Attys
Earle Seymour

UNITED STATES PATENT OFFICE.

OLIVER D. WOODRUFF, OF SOUTHINGTON, CONNECTICUT, ASSIGNOR TO THE ENTERPRISE MANUFACTURING COMPANY, OF PHILADELPHIA, PENNSYLVANIA.

MEAT-CUTTER.

SPECIFICATION forming part of Letters Patent No. 481,882, dated August 30, 1892.

Application filed February 16, 1891. Serial No. 381,680. (No model.)

*To all whom it may concern:*

Be it known that I, OLIVER D. WOODRUFF, of Southington, in the county of Hartford and State of Connecticut, have invented a new Improvement in Meat-Cutters; and I do hereby declare the following, when taken in connection with accompanying drawings and the letters of reference marked thereon, to be a full, clear, and exact description of the same, and which said drawings constitute part of this specification, and represent, in—

Figure 1, a front or crank-end view of the machine; Fig. 2, a vertical section on line $x$ $x$ of Fig. 1; Fig. 2$^a$, a modification in the arrangement of the diagonal ribs on the forcer; Fig. 3, an enlarged vertical section on line $y$ $y$ of Fig. 2; Fig. 4, a longitudinal central section of a portion of the case; Figs. 5 and 6, modifications in the formation of the delivery-openings; Fig. 7, a side elevation of a portion of the crank-shaft; Fig. 8, a sectional view of the head of the crank; Fig. 9, a sectional view of the crank and crank-shaft on line $z$ $z$ of Fig. 7.

This invention relates to improvements in that class of cutters in which a case provided with a hopper at one end for the introduction of the meat is employed and constructed at the other end for the discharge of the cut meat, combined with a rotative shaft longitudinally in the casing, and by the rotation of which shaft the meat is forced from the entrance end to the discharge and cut in its progress through the case, in contradistinction to that class in which the cutting is performed entirely at the discharge end.

The object of the invention is to construct a machine in which the parts may be so completely formed in the process of casting as to require but little mechanical labor in fitting and assembling them, and also to construct the machine so that the meat may be thoroughly cut and disintegrated within the case before it reaches the discharge end without the employment of radial cutters, and also to provide numerous discharge-openings at the discharge end of the case, so that the meat will be discharged from the machine in clearly-separated streams in similar manner to the discharge of machines employing perforated plates at the discharge end, through the perforations of which the meat is forced in streams, parts of the invention being applicable to machines in which radial cutters are arranged, so as to do at least a portion of the cutting at the discharge end of the machine.

The invention consists in the construction and combination of parts, as hereinafter described, and more particularly recited in the claims.

A represents the case, which is of conical form and preferably with a gradual taper from one end to the other. At the larger end the case is provided with a hopper B, through which the meat to be cut may be introduced in the usual manner for this class of machines. At the other or smaller end the case is open, except as to an annular flange C around the inside at that smaller end. The interior of the case from the larger end forward to the smaller end is constructed with a series of spiral ribs $a$, the ribs inclining toward the smaller end, and as seen in Fig. 4. These ribs project from the inner surface and preferably so as to be substantially in the plane of the flange C, as seen in Fig. 2. Combined with the ribs $a$ is a series of other spiral ribs $b$, the ribs $b$ commencing substantially at the larger end and running toward the lower end, but at a pitch very considerably greater than the pitch of the ribs $a$, and so that the ribs $b$ diagonally cross the ribs $a$, as clearly seen in Fig. 4. The ribs $b$ project from the inner surface of the case substantially flush with the ribs $a$.

Within the casing the forcer and cutter D is arranged. It is attached to or formed as a part of a shaft E, which extends through the larger end of the case, and, projecting at that end, is adapted for the attachment of a crank or pulley or other means for imparting revolution to the shaft and the forcer. The forcer is of conical shape, corresponding substantially to the interior of the case. It is constructed with spiral ribs $d$, starting from the larger end and running toward the smaller end, preferably with a gradually-decreasing pitch, as seen in Fig. 2. These ribs form grooves in the periphery of the forcer, the faces of the ribs corresponding to and so as to run in close contact with the ribs *a b* in the case, these ribs *d* substantially taking a bearing within the ribs *a b*, which supports the forcer. The larger end of the forcer is adapted to receive the meat in the usual manner for this class of machines, and particularly as set forth in Letters Patent No. 443,589, granted to me December 30, 1890. The forcer is also constructed with a second series of spiral ribs *e*. These ribs, starting from near the larger end, run toward the smaller end at a greater pitch than that of the ribs *d*, and so that the ribs *e* diagonally cross the ribs *d*, the ribs *e* being flush with the face of the ribs *d*.

In my patent before referred to the forcer was constructed with one series of spiral ribs *d*, the same as described in this application; but instead of employing a series of diagonal ribs crossing the spiral ribs *d* the forcer was constructed with longitudinal straight ribs crossing the spiral ribs. While I prefer to arrange the ribs *e* as in a spiral line, they may be simply ribs diagonal to the axis of the forcer, extending from one rib to the next, and not necessarily in continuous line, and as represented in Fig. 2ª. The forcer being revolved and meat introduced through the hopper, the meat will be forced forward into the case and between the inner surface of the case and the forcer. It there meets the two series of spiral ribs of the case, which are continuously crossed by the spiral ribs and the diagonal ribs of the forcer, which operate together to cut the meat as it passes through the case, and so that when it arrives at the other end, as it necessarily must under the advancing action of the forcer, the meat will be completely hashed or minced before it reaches the discharge end.

The forcer is constructed at its outer or smaller end with an annular rib F, the external diameter of which corresponds to the internal diameter of the flange C of the case, and so as to fit closely therein like a bearing, as it were, for the forcer. These flanges may take the entire bearing of the forcer in revolving, the spiral ribs of the forcer and of the case running in so close contact as to positively cut the meat.

The flange C of the casing is constructed with a series of notches *f* around its inner edge, and, as seen in Fig. 3, these notches *f* are made from the inner edge of the flange outward, and so that the inner sides of the notches are open, as shown; but when the forcer is in place the flange F at the end of the forcer runs in close contact with the open sides of these notches, so as to close that side of the notches and complete the discharge-openings. Thus with the forcer in place the discharge end of the casing exposes a concentric series of openings around the end of the forcer. The meat after having been thoroughly disintegrated and cut between the forcer and the case arrives at the discharge end, and under the action of the forcer the advancing meat drives the meat already cut through the notches *f* in clearly-defined streams in similar manner to the discharge of the meat from machines employing perforated plates at the end of the casing, through which the meat is forced.

By constructing the notches *f* with one side open, as described, they are much more readily cleared than actual perforations can be, and this construction adds materially to the facility with which the machine may be cleaned.

Instead of making the notches in the casing they may be made in the forcer, as represented in Fig. 5, and accomplish substantially the same result.

This part of the invention, which relates particularly to the formation of the discharge-openings, may be of advantage in machines which employ a perforated plate and perform the whole or a portion of the cutting in connection with the perforations of the plate Such an illustration is seen in Fig. 6, where A represents the case, G represents the perforated plate, and H the end of the shaft. The plate is constructed with a series of notches around its outer edge, and also with a series of notches around the shaft, which in many cases will give the required discharge from the machine. The outer series of notches in this construction is closed at the open side by the case, while the inner series of notches is closed at the inner side by the shaft, which extends through the center of the plate.

The two series of spiral ribs which I have described as formed in the interior of the case may be employed in machines with the discharge otherwise constructed—as, for illustration, in the construction like my patent before referred to.

The two series of spiral ribs which are described as formed upon the inside of the case add materially to the cutting capacity of the machine, make the cutting easier than by the employment of the single series of ribs, and also aid in the forcing of the meat toward the discharge end.

The construction of the forcer with the diagonal ribs *e* crossing the spiral ribs of the forcer produce, in connection with the spiral ribs of the case, a shearing cut much easier than when the ribs crossing the spiral ribs are arranged longitudinally, as in my patent before referred to. The diagonal ribs also aid in forcing or advancing the meat, and in the combination of the ribs on the forcer and of the casing, as I have described, the operation of the machine is much easier and the production very greatly increased. The second series of diagonal or spiral ribs *e* on the forcer may also be employed in such machines to advantage, particularly in the machine of my patent before referred to.

The case in the smaller class of machines, which is here illustrated, requires but a single support I to rest upon a table or bench and may be constructed for conveniently clamping the machine to the table, as represented, or any suitable device may be employed for securing the machine to a table or bench.

To secure the crank to the shaft, so that there may be no liability of its escape while in operation, and yet readily detached as occasion requires, I form in the end of the crank-shaft E a side recess J, which is of a dovetail form in side view, with overhanging walls and its inclined sides arranged in a spiral form, said spiral sides being the nearest to each other at the outer end of the crank-shaft.

The head K of the crank L is provided with a dovetailed projection M, the sides of which are overhanging and inclined on a spiral conforming to that in the walls of the recess J. The width of this projection at its widest end is such as will pass between the narrowest part of the groove J, and its radial thickness is equal to or a trifle less than the depth of the groove J.

In order to attach the crank, it is slipped upon the end of the shaft with the internal projection M in the recess J until the end of said projection strikes the end of the recess. The crank is then revolved—as, for instance, in the direction indicated by the dart in Fig. 9. When the spiral inclined sides of the projection and recess come into engagement, the forward corner of the projection is pressed firmly into the forward inner corner of the recess, thereby holding the crank firmly upon the shaft so long as it is revolved in a given direction. By revolving the crank in the opposite direction the walls upon the other side of the projection and recess have the same action; but the crank may be detached, when desired, by letting the projection come to a central position in the recess.

From the foregoing it will be understood that I claim nothing in this application shown or described in my patent before referred to, except as in the combination hereinafter specified.

I claim—

1. In a meat-cutter in which the meat is delivered from one end of the case, and the case containing cutting mechanism to cut the meat, the discharge end having one or more series of notches through which the cut meat is discharged, the said notches formed in the edge of the part which contains them and so as to leave one side open, that side being closed by the adjacent part and so as to complete the openings, substantially as described.

2. The combination, in a meat-cutter, of the casing, a series of spiral ribs on the interior of the casing, said spiral ribs inclining from the entrance to the discharge end of the machine and having the second series of spiral ribs intersecting the first-mentioned ribs and running from near the entrance to the discharge end, but at a greater pitch than that of the first-mentioned series, with a forcer adapted to revolve in the casing, said forcer being constructed with one or more spiral ribs to work in direct contact with the spiral ribs of the casing, and whereby said spiral rib of the forcer, while serving to force the meat through the case, operates as a cutter in connection with the two series of spiral ribs in the case, substantially as specified.

3. The combination, in a meat-cutter, of the casing having internal spiral ribs $a$ and $b$, the ribs $b$ being of a greater pitch than and intersecting with the ribs $a$, with a forcer having spiral ribs $d$ and $e$, the ribs $e$ being of a greater pitch than the ribs $d$, the ribs of the forcer being in direct contact with those of the case, whereby the said ribs, while serving to force the meat through the case, operate, in conjunction with the ribs of the case, to cut the meat, substantially as described.

4. The combination of a meat-cutter case having at its discharge end an annular series of notches, suitable cutting mechanism, and at the delivery end of the shaft or central member a solid end that fills the space inside of and so as to close that side of said notches and form discharge-openings, substantially as and for the purpose described.

5. In a meat-cutter, the combination of the crank-shaft E, having dovetailed recess J, with overhanging spiral sides, and a crank-head K, having an internal dovetailed projection M, fitted to said recess, substantially as described, and for the purpose specified.

6. The combination, in a meat-cutter, of the casing, a hopper at the enlarged end of the casing, an opening in the smaller end of the casing, a series of projections at the end of the casing, forming notches, two sets of spiral ribs on the interior of the casing, one set being of a greater pitch than the other set, the said ribs intersecting, a tapered forcer adapted to the casing and having two sets of spiral ribs, one set being of a greater pitch than the other, the said ribs intersecting, said forcer having a solid end which closes the opening in the smaller end of the casing, leaving only the notches for the discharge of meat, substantially as described.

In testimony whereof I have signed this specification in the presence of two subscribing witnesses.

OLIVER D. WOODRUFF.

Witnesses:
GEO. D. SEYMOUR,
FRED C. EARLE.